I. SPRINGER.
Saw-Mill Dogs.
No. 222,606. Patented Dec. 16, 1879.
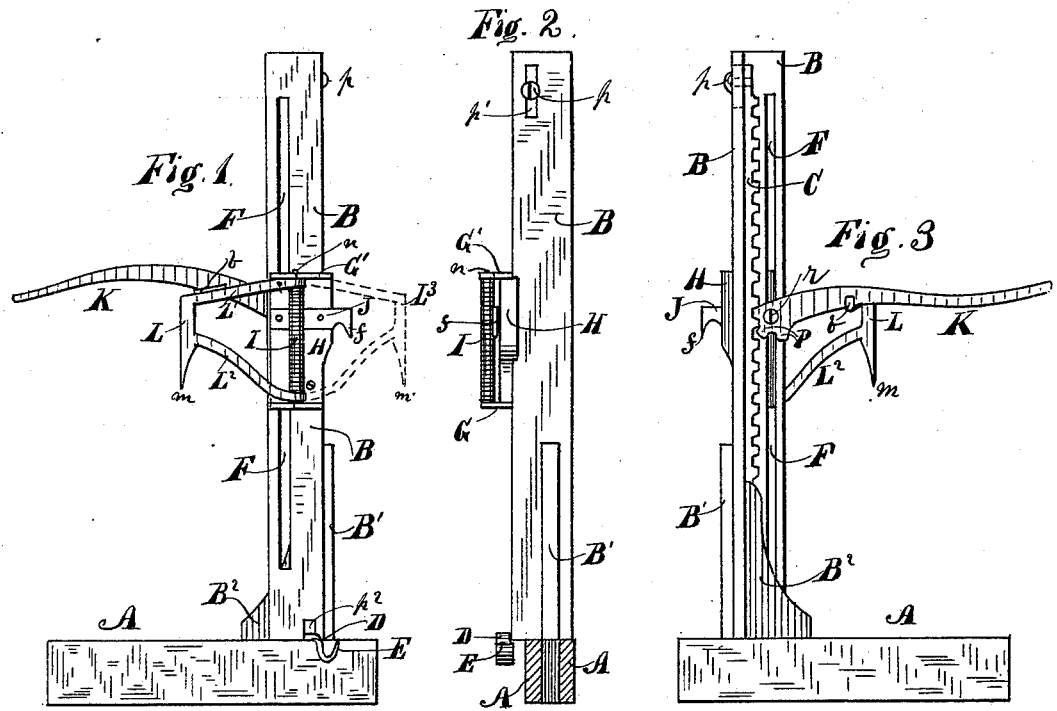
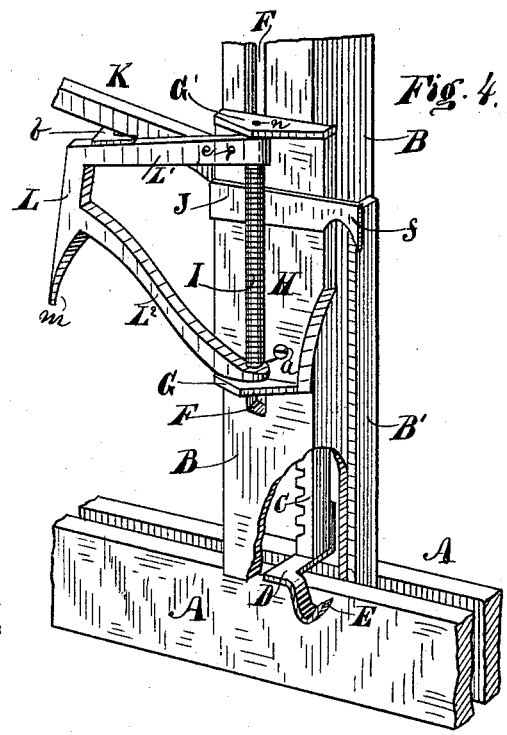

UNITED STATES PATENT OFFICE.

ISAAC SPRINGER, OF INDIANAPOLIS, INDIANA.

IMPROVEMENT IN SAW-MILL DOGS.

Specification forming part of Letters Patent No. 222,606, dated December 16, 1879; application filed August 25, 1879.

*To all whom it may concern:*

Be it known that I, ISAAC SPRINGER, of Indianapolis, in the county of Marion and State of Indiana, have invented a new and useful Adjustable Saw-Mill Dog, of which the following is a specification, reference being had to the accompanying drawings.

The object of my invention is to provide an adjustable device for holding logs on a head-block while being sawed.

My invention consists in the new construction and arrangement of parts and in the new combination of elements which are deemed essential in my newly-organized adjustable saw-mill dog, as will be hereinafter first fully described, and then set forth in the claims.

In the accompanying drawings, in which like letters of reference in the different figures indicate like parts, Figure 1 represents a side elevation of my improved device. Fig. 2 is a front elevation of the same. Fig. 3 is a side elevation of the same, showing the opposite side from that in Fig. 1; and Fig. 4 is a perspective view of the device.

A represents the head-block, on which is mounted the angular upright standard B B, with a vertical projecting rib, B', in front for the log to rest against. One side of the standard is provided with a vertical slot, F, in which the slide H operates. On the inner side of the angular upright is a vertical rack-rod, C, Figs. 3 and 4, the upper end of which is secured to the front of the angular upright by the bolt $p$, which operates in the slot $p'$, so as to permit the rack to rise and fall. The lower end of the rack C is provided with a dog, D. (Shown more fully in Fig. 4.) The dog D operates to rise and fall in a slot, $p^2$, in the bottom of the side of the angular upright B, as shown.

The dog D projects outward, and then turns forward, and is provided with a sharp hook or spur, E, at the end, to catch on the log after the log has been slabbed, close to the rib B', so as not to interfere with the saw.

The rack is operated by the cogs P on the lever K, and the lever is pivoted to the slide H at $r$. The slide H operates to rise and fall on the outer side of the angular upright, as shown. The slide H is provided with two projecting brackets—G below, G' above.

The adjustable and reversible dog L is constructed like that shown in Fig. 4, the arms L' and L² being pivoted to the rod $n$, which passes through the upper and lower brackets, G G'. The dog L is held in the position shown in Figs. 1, 3, and 4 by the spring I, which is coiled on the rod $n$. One end of the spring is secured to the slide H at $a$, and the other end to the arm L' of the dog L at $e$, as shown.

The lever K is designed to rest on the lug or arm $b$ when the dog L is in the position shown in Fig. 4. When the dog L is in the position shown in Fig. 4, then the small dog J $f$ may be used in connection with the dog D E if the log has been squared up.

The operation of my improved dog is as follows, to wit: A log is first rolled on the head-block. The dog L is then turned into position as shown by dotted lines in Fig. 1. The lever K is then raised to allow the cogs P to be out of gear with the rack C, and the dog let fall on the log. Then, by pressing down on the lever K, the dog-point $m$ is forced into the log and holds it until slabbed. After the log has been squared up, then one of its flat sides is placed against the rib B'. The log-dog L is then carried back by the spring, as shown in Figs. 1, 3, and 4, and the short dogs D E and J $f$ are used, each of which is forced into the log, one at the top, the other at the bottom, close to the rear edge of the log, yet sufficiently far from the edge to hold it and yet not interfere with the saw in sawing off the last board.

Both the upper and lower dogs—one on the slide and the other at the bottom of the rack-rod—are operated by the lever K, the rod C, and slide H, as shown.

Having thus described my invention, what I claim is—

1. The angular uprights B B, provided with a slot, F, in one side, and also provided with slots $p'$ $p^2$, as shown, combined with the head-block A, the sliding rack C, the lever K, and the slide H, substantially as described and set forth.

2. In combination with the angular uprights

B B, provided with slots F $p'$ $p^2$, the rack-rod C, with dog D E, the lever K, and the slide H, provided with the stationary dog J $f$, as and for the purpose specified.

3. In combination with the angular uprights B B, provided with slots F $p'$ $p^2$, the sliding rack-rod C, the lever K, and slide H, said slide being provided with a reversible dog, L' $L^2$ L, as and for the purpose specified.

4. In combination with the slide H, having brackets G G', and a stationary dog, J $f$, the reversible dog L L' $L^2$, and spring I, as and for the purpose specified.

5. The dog L L' $L^2$, provided with an arm, $b$, combined with the slide H and spring I, as and for the purpose specified.

In testimony whereof I have signed my name to this specification in the presence of two subscribing witnesses.

ISAAC SPRINGER.

Witnesses:
SAMUEL DEWEY,
DANL. E. STONE.